United States Patent [19]

Green

[11] 4,280,942

[45] Jul. 28, 1981

[54] AQUEOUS ACRYLIC CONTACT ADHESIVE

[75] Inventor: Robert W. Green, Loveland, Ohio

[73] Assignee: Formica Corporation, Cincinnati, Ohio

[21] Appl. No.: 167,252

[22] Filed: Jul. 9, 1980

[51] Int. Cl.³ .................. C08L 93/04; C08L 61/10; C08L 33/10

[52] U.S. Cl. .................. 260/27 R; 260/29.3; 260/29.6 WA; 260/33.2 R; 428/500; 428/514; 525/57

[58] Field of Search ............... 260/27 R, 29.3, 33.2 R, 260/29.6 WA; 525/57

[56] References Cited

U.S. PATENT DOCUMENTS

| | | | |
|---|---|---|---|
| 2,773,050 | 12/1956 | Caldwell et al. | 525/57 |
| 3,247,141 | 4/1966 | Stryker et al. | 260/27 R |
| 3,311,581 | 3/1967 | Pierce | 525/57 |
| 3,746,677 | 7/1973 | Arai et al. | 260/27 R |
| 3,932,335 | 1/1976 | Gorton | 260/29.6 WA |
| 4,025,454 | 5/1977 | Rouzier | 260/29.3 |
| 4,124,554 | 11/1978 | Fry | 260/29.2 UA |
| 4,183,834 | 1/1980 | Evans et al. | 260/29.2 UA |

*Primary Examiner*—H. S. Cockeram
*Attorney, Agent, or Firm*—Frank M. Van Riet

[57] ABSTRACT

An adhesive composition comprising an aqueous emulsion of polyacrylates sufficiently stabilized in part with a vinyl alcohol polymer, a tackifying resin and a plasticizer is disclosed, which adhesive has utility as a low hazard contact cement for bonding on contact numerous materials to various substrates under a wide range of environmental work conditions.

10 Claims, No Drawings

AQUEOUS ACRYLIC CONTACT ADHESIVE

BACKGROUND OF THE INVENTION

Elastomeric contact adhesives have been commercially formulated in both solvent and water based systems for many years. Both types have been marketed for industrial and consumer consumption. Those familiar with using contact adhesives for decorative laminate fabrication, however, have found that the solvent based types will work more predictably and effectively under a wide range of fabricating conditions. Water based systems while being substantially or entirely free from the inherent toxic and hazardous properties of solvents, do not always work well and user acceptance has been less than enthusiastic. Fabricators have found that if the work area is less than ideal, (e.g., too cold, too damp, too dry or even in some cases too breezy) water based systems will not bond or perform properly. Since users do not monitor their work area conditions the performance of such is unpredictable. Failures of such can be immediate or latent, either of which is costly.

Although solvent based contact adhesives have been widely accepted for their superior and predictable properties by those familiar with decorative laminate fabrication techniques, the employment of such has not been without problems. One of the most difficult problems has been the need of venting solvent vapors from the environs. Depending upon the formulation, these vapors can be either toxic and/or extremely flammable, obnoxious or even corrosive under certain conditions of use. Proper ventilation or exhausting of such is necessary for safety reasons but due to environmental regulations this in itself is also becoming a real problem. Many areas or communities have regulations closely governing the discharge of various solvents into the air. These regulations are subject to change which further complicates efforts aimed at compliance.

Safety requirements, as implimented by insurance companies, labor groups and government agencies for transporting, selling and using solvent based contact adhesives have indirectly and directly increased the cost associated with their usage. The hazards and risks affiliated with their usage no doubt have been lessened as a result but not totally eliminated. Accidents due to carelessness and ignorance still occur. The need for a low hazard contact adhesive having the bond performance properties of solvent based types is therefore apparent and the discovery of such would clearly constitute a step forward in the art.

SUMMARY

A novel, low hazard water based contact adhesive has now been discovered. The novel adhesive compositions described herein exhibit excellent performance properties under a wide range of use conditions where only hazardous solvent based adhesives have found industrial and consumer acceptance heretofore.

Additionally, the novel adhesives of this invention are more easily formulated than most other water-based contact adhesive systems in that incorporation of resin tackifier is carried out by in-situ addition thus saving extra production steps by eliminating the need of adding such from dispersion or emulsion form. Also, as a result, additional non-adhesive ingredients such as dispersants and stabilizers necessary to make the resin dispersion or emulsion are not required.

In-situ addition of the resin tackifier also allows higher solids formulations since additional water is not carried along with the resin. Since the novel adhesives disclosed herein utilize certain polyacrylates, they also tend to be easier and less costly to formulate than those based upon polychloroprene latex systems. Polyacrylates do not require antioxidants and acid acceptors such as zinc oxide since the acrylics do not liberate small amounts of hydrogen chloride upon aging due to oxidation as does polychloroprene. This, besides eliminating the need for making and adding antioxidant and zinc oxide dispersions also allows the formulator to further restrict the incorporation of dispersants, surfactants, etc. commonly employed in stabilizing such.

Additionally, polyacrylate emulsions do not require careful control of alkaline reserve for stability purposed as do the polychloroprene emulsions prior to compounding. Simple pH monitoring and pH adjustments of the acrylate emulsions prior to compounding is usually sufficient. By being able to greatly restrict the use of non-adhesive processing aides such as dispersants, surfactants, emulsifiers, etc., that are normally added along with the resin, antioxidant and acid acceptor dispersions, the overall performance of this adhesive is superior to other latex types. Most of these ingredients normally used adversely affect the overall bonding characteristics of a latex based adhesive and thereby greatly restrict its ability to perform adequately as a contact adhesive over a wide range of use conditions. The novel water-based adhesive of this invention, however, has been found to exhibit the same desirable "foolproof" bonding properties which characterize solvent-based contact formulations.

DESCRIPTION OF THE INVENTION INCLUDING PREFERRED EMBODIMENTS

The present invention is directed to a novel adhesive composition comprising (A), 100 parts, by weight, of an acrylate polymer as contained in an aqueous emulsion containing from about 40-65% of that polymer, by weight, (B) from about 0.5-5% of a vinyl alcohol polymer, based on the total weight of the aqueous acrylate polymer emulsion, (C) from about 20-70 parts, by weight, of tackifying resin per hundred parts by weight of the acrylate polymer and (D) from about 10-35 parts, by weight, of a resin plasticizer per hundred parts by weight of the acrylate polymer.

THE ACRYLATE POLYMER

The acrylate polymer employed as the first component of the adhesive composition hereof can be any acrylic polymer based upon such monomers as acrylic acid, methacrylic acid, methyl acrylate, ethyl acrylate, n-butyl acrylate, methyl methacrylate, ethyl methacrylate, etc. with the $C_1$-$C_8$ alkyl esters of acrylic acid or methacrylic acid being preferred and ethyl acrylate being more preferred. These polymers are well known to those skilled in the art and are generally polymerized or copolymerized in the form of an anionic, nonionic or anionic-nonionic emulsion system having at least about 40% by weight of solids and having glass transition temperatures ranging from about $-20°$ to $+15°$ C. with the range of $-10°$ to $+10°$ C. being preferred. The molecular weights of such should be at least 10,000. Preferably, the polymer should contain from about 60-98% ethyl acrylate copolymerized with other acrylic monomers to give the desired Tg. Approximate values of Tg for copolymers can be calculated from the Tg values (in degrees Kelvin) of the individual homopolymer components by using the following formulation:

$$(1/Tg) = (W_1/Tg_1) + (W_2/Tg_2) + (W_3/Tg_3) + \cdots + (W_n/Tg_n)$$

In this formulation a linear relation to the weight composition (W) is assumed. It is more fully described in "Emulsion Polymerization of acrylic Monomers", Bull. CM-104 A/cf, page 65 from Rohm & Haas. Glass transition values in °C. for individual homopolymers are readily available from various technical sources. Such are readily converted to degrees Kelvin for use in above formula.

THE VINYL ALCOHOL POLYMERS

The vinyl alcohol polymers, useful herein are produced, as is known in the art, by the hydrolysis of a poly-vinyl ester such as poly (vinyl acetate). The poly-vinyl alcohol behaves as a protective colloid and also forms a syngergistic emulsifying combination with other surface active ingredients.

In our novel adhesive, it is preferred that the vinyl alcohol polymers be at least about 65% hydrolyzed with a range of about 70%–90% being more preferred. The solution viscosity range of this polymer in a 4% aqueous solution @ 20° C. should be between about 2 and 50 centipoises with a range of 2.4 to 6.0 being preferred.

The afore described polyvinyl alcohol polymer is present in the afore described polyacrylate emulsions in the amount of about 0.5% to 5.0% by weight of the emulsion with about 0.75% to 2.5% being the preferred range. The optimum level for a particular commercial grade will depend in part upon one's preferred viscosity range of the final adhesive. Generally it has been noted that grades having lower degrees of hydrolysis are more efficient than those having degrees of hydrolysis close to or at the upper preferred limits for such.

THE TACKIFYING RESINS

The tackifying resins employed in the formulation of the novel adhesive compositions hereof are well known to those skilled in the art. Excellent results have been achieved using the hydroxyalkylated alkylphenol-formaldehyde resins, especially those which are hydroxymethylated. Examples of alkylphenols which may be reacted with the formaldehyde before hydroxyalkylation include p-t-butyl phenol, p-t-octyl phenol, p-t-amyl phenol, p-cresol, bisphenol A and the like. The usable resins so described have capillary melting points ranging from about 60° C. to 83° C.

Employment of thermoplastic terpene-phenolic resins have also proven effective. These resins include those prepared from alpha-pinene, beta-pinene, dipentene, d-limonene and the like. The preferred melting point (Ball and Ring, ASTM E-28) range for this type of resin is about 110°–120° C.

Certain rosin esters have also been found to be effective tackifiers for this novel adhesive. Those types so employed are derived commercially by the esterification of tall oil rosins with glycerol or pentaerythritol. These rosin esters should have a softening point (Ball and Ring, ASTM E28) of about 50°–110° C. Acid numbers for such should be below 12 with those less than 8 being more preferred. The tackifying resins and/or blends of such as mentioned above, are employed as solvent solutions of at least 60% solids with 65 to 75% solids being preferred. Solvents useful for this purpose are aromatic or ester types which include toluene, xylene, amyl acetate, N-propyl acetate, isobutyl acetate and the like. The adhesives of this invention contain from about 20–70 parts by weight per 100 parts by weight of the polyacrylate polymer of the tackifying resin.

THE RESIN PLASTICIZER

To further develop desirable tack properties in the novel adhesive composition hereof, certain other compounds are utilized as resin plasticizers. Those found to be most effective are substituted phenol-ethylene oxide reaction products such as octyl phenoxy ethanol, octyl phenoxy diethoxy ethanol and nonyl phenoxy polyethoxy ethanol each having an average of 3 or less ethylene oxide (EO) units in the ether side chain. Such are commercially produced by reacting octyl or nonyl phenol as the case may be with ethylene oxide.

Another plasticizer found to be effective is diethylene glycol dibenzoate. Other types are no doubt useful too so long as they plasticize the desired resin tackifier sufficiently. For the purpose of this invention, the amount of this resin plasticizer herein described shall be between about 10–35 parts by weight per hundred parts by weight of the polyacrylate polymer with the range of about 15–25 parts being more preferred.

The novel adhesive compositions of the present invention are produced by blending the resin tackifier solution directly into the acrylic latex, previously described, with which has been blended, either during polymerization or by post addition, a poly vinyl alcohol also previously described herein. The in-situ addition of the tackifier is accomplished under either low or high shear mixing. To enhance the incorporation of such, the resin solution can be warmed slightly to about 25° to 35° C. and poured slowly into the vortex of the stabilized emulsion. The emulsion itself should preferably be between 25°–35° C.

Once the resin solution has been fully incorporated, the same procedure is used to add the resin plasticizer.

Small amounts of other ingredients may be incorporated into the adhesive composition without detracting from the advantageous properties of the adhesive. For example, one may incorporate fungicides, dyes, etc. in order to further enhance the adhesive.

The following examples are set forth for purposes of illustration only and are not to be construed as limitations on the present invention except as set forth in the appended claims. All parts and percentages are by weight unless otherwise specified.

EXAMPLE I

A polyacrylate emulsion, hereafter designated as Emulsion A, having the following composition and properties is employed.

| Emulsion A composition: | |
|---|---|
| Ingredients | parts by weight (pbw) |
| ethyl acrylate | 38.5 |
| methyl methacrylate | 7.2 |
| acrylic and/or methacrylic acid | 2.4 |
| water | 47.0 |
| poly (vinyl alcohol) (87–89% hydrolyzed-viscosity 4–6 cps) | 1.6 |
| other (primary emulsifier, anionic) | 3.3 |
| | 100.0 |

| Emulsion A Properties: | |
| --- | --- |
| solids content | 53% by weight |
| pH | 5.7 |
| Viscosity (Brookfield, #2 spindle @ 50 RPM) | 540 centipoise/sec. |
| Tg of acrylic portion, calculated | −4° C. |
| molecular weight (polymer) | 50,000+ |

Emulsion A has sufficient poly (vinyl alcohol) of the type herein described therein and therefor additional poly (vinyl alcohol) does not have to be post added.

Employing the aforementioned Emulsion A, a contact adhesive is compounded by homogeneously incorporating the following ingredients in the order shown. Temperature of emulsion and ingredients is between 25° and 35° C.

| Emulsion A @ 53.0 solids | 188.7 (pbw) |
| --- | --- |
| 70% solution of hydroxymethylated alkylphenol-formaldehyde resin (capillary m.p = 152° F.) in xylene | 71.5 |
| octylphenoxyethanol having an average of 1 ethylene oxide unit | 25.0 |
| water | 21.8 |
| fungicide | .3 |

The resultant adhesive, after being cooled to room temperature is adjusted to 5.9–6.0 pH using 14% ammonium hydroxide solution which is added slowly with sufficient agitation to prevent shock. Test results obtained with Example I adhesive are as follows:

| formulation pH | 5.9 |
| --- | --- |
| % solids | 57.0 |
| flash point (TCC) | 159° F. |
| viscosity (Brookfield, #5 spindle @ 50 rpm) | 1440 cps |

When brushed into test pieces of high pressure decorative laminate and flakeboard at low, ambient and high humidity conditions (70°–75° F. @ 14%, 41% and 86%, respectively) and allowed to air dry at such conditions, good bonds are easily established using minimal pressure to effect fusion after contact. Mated glue lines exhibited the same "grab" characteristics achieved using a well formulated solvent-based adhesive.

EXAMPLE II

A polyacrylate emulsion, hereafter designated as Emulsion B, having the following composition and properties is used.

| Emulsion B composition: | |
| --- | --- |
| ingredients | parts by weight (pbw) |
| ethyl acrylate | 47.2 |
| methyl methacrylate | 6.0 |
| acrylic and/or methacrylic acid | 2.8 |
| water | 40.0 |
| other (primary emulsifier) | 4.0 |
| | 100.0 |

| Emulsion B Properties | |
| --- | --- |
| solids content | 60% |
| pH | 4.5 |
| viscosity (Brookfield, #2 spindle @ 50 rpm) | 300 centipoise/sec. |
| Tg of acrylic portion, calculated | −1° C. |
| Molecular weight-polymer | 55,000+ |

Employing the Emulsion B so described, a contact adhesive is compounded by homogeneously incorporating the following ingredients in the order shown.

| Emulsion B @ 60% solids | 166.7 (pbn) |
| --- | --- |
| 20% solution of partially hydrolyzed (87–89%), low viscosity grade of polyvinyl alcohol (viscosity 4–6 cups) in water | 16.5 |
| Water | 20.0 |
| 70% solution of hydroxymethylated alkyl phenol-formaldehyde resin (capillary m.p. 152° F.) in xylene | 71.5 |
| Octylphenoxyethanol having an average of 1 ethylene oxide unit | 22.0 |
| Fungicide Dispersion | .3 |
| Water | 9.0 |

The resultant adhesive has the following physical properties:

| formulation pH | 4.0 |
| --- | --- |
| % solids | 57.3 |
| viscosity (Brookfield, #3 spindle @ 50 rpm) | 1100 centipoise/sec. |

Example II adhesive, when brushed onto test pieces of high pressure decorative laminate and flakeboard at ambient conditions (84° F./52% RH) demonstrate good bonds after air drying. Fusion is easily established using minimal pressure.

EXAMPLE III

The procedure of Example I is again followed except that the 70% phenolic resin solution is replaced with a 70% solution of a terpene-phenolic resin having a Ball and Ring melt point of 115° C. Similar results are obtained.

EXAMPLE IV

The procedure of Example I is followed except that a 70% rosin ester solution having a melting point, Ball and Ring, of 85° C. is used in place of the phenolic resin. Again similar results are obtained.

EXAMPLE V

To a clean glass reactor having an agitator are added 345 parts of distilled water and 18.0 part of a 50/50 mixture of octylphenoxy polyethoxy ethanols having about 16 and 30 ethylene oxide units respectively. The resultant media is stirred while heating to about 50° C. to obtain a solution. Once a solution is established, 100 parts of distilled water are added and the mixture cooled to 33° to 35° C. An acrylic monomer blend is prepared by mixing 880 parts of ethylacrylate; 214 parts of methyl methacrylate; 6.0 parts of methacrylic acid and 54 parts of the above 50/50 mixture of ethoxyethanols. A redox catalyst is prepared by dissolving 8.4 parts of sodium metabisulfite in 198 parts of water for the first part and 11 parts of ammonium persulfate in 89 parts of water for the second part. A nitrogen purge of the reactor is begun while stirring continues and the temperature is maintained at 33°–35° C. Once the purge is completed, the nitrogen flow is reduced to a sufficient rate so as to maintain a nitrogen blanket over the reactor. To the reactor are added 10%, by weight, of the acrylic monomer blend (123.1 parts); 10% of sodium metabisulfite solution (20.6 parts) and 10% of the ammonium persulfate solution (10.0 parts) and polymerization is begun. The remaining portion of the acrylic monomer blend and redox catalyst is added at a uniform feed rate over a 6 hour period. In a separate vessel there is dissolved 10 parts of a low viscosity grade of 72.9–77% hydrolyzed polyvinyl alcohol in 90 parts of water. This solution is charged to the polymerization reactor after the monomer blend and redox catalyst is completely added. The reactor vessel is then cooled to about 30° C. and the nitrogen flow is terminated. The resultant emulsion is then removed from reaction vessel, strained to remove any coagulum and stored in a suitable container at room temperature. Upon testing, the resultant emulsion is found to have the following properties:

| solids content | 57.8% by weight |
|---|---|
| pH | 2.4 |
| Viscosity (Brookfield, #5 @ 50 rpm) | 1750 centipoise/sec. |
| Tg of acrylic portion, calculated | −4° C. |
| Molecular Weight-polymer | 60,000+ |

After adjusting the emulsion obtained to a pH of about 6 with triethanolamine, a contact adhesive is compounded by homogeneously incorporating therein the following ingredients in the order shown. Temperature of emulsion and ingredients is about 25° C.

| Emulsion @ 57.8% solids | 173.0 (pbw) |
|---|---|
| 20% solution partially hydrolyzed (72.9 –77%), low viscosity grade polyvinyl alcohol having a viscosity of 2.4–3 cps. | 39.0 |
| water | 11.4 |
| 70% solution of hydroxymethylated alkyl phenol-formaldehyde resin (capillary m.p. 152 ° F.) in xylene | 71.5 |
| Octylophenoxyethanol having an average of 1 ethylene oxide unit | 22.0 |
| Water | 10.0 |
| | 326.9 |

The resultant adhesive has the following properties

| formulation pH | 5.7 |
|---|---|
| % solids | 55.0 |
| Viscosity (Brookfield #3 spindle @ 50 csp) | 1200 centipoise/sec. |

Adhesive so made when brushed onto test pieces of high pressure decorative laminate at ambient conditions (70° F./30% RH) demonstrate good bonds after air drying. Establishment of adequate fusion of the mated glue lines is accomplished with minimal pressure.

EXAMPLE VI

The procedure of Example I is again followed except that the hydroxyphenoxyethanol is replaced by an equivalent amount of diethyleneglycol dibenzoate. Similar results are achieved.

We claim:

1. An adhesive composition comprising (A) 100 parts, by weight, of an acrylate polymer as contained in an aqueous emulsion containing from about 40–65% by weight of said acrylate polymer, (B) from about 0.5–5%, based on the total weight of said acrylate polymer emulsion, of a vinyl alcohol polymer, (C) from about 20–79 parts, by weight, per 100 parts of said acrylate polymer, of a tackifying resin and (D) from about 10–35 parts, by weight, per 100 parts of said acrylate polymer, of a resin plasticizer.

2. A composition according to claim 1 wherein said acrylate polymer contains from about 60–98% ethyl acrylate.

3. A composition according to claim 1 wherein said vinyl alcohol polymer is at least about 65% hydrolyzed.

4. A composition according to claim 1 wherein said tackifying resin is a hydroxyalkylated alkylphenolformaldehyde resin.

5. A composition according to claim 1 wherein said tackifying resin is a thermoplastic terpene-phenolic resin.

6. A composition according to claim 1 wherein said tackifying resin is a rosin ester.

7. A composition according to claim 1 wherein said resin plasticizer is a substituted phenol-ethylene oxide reaction product.

8. A composition according to claim 1 wherein said resin plasticizer is octyl phenoxy ethanol.

9. A composition according to claim 4 wherein said tackifying resin is a hydroxymethylated alkylphenolformaldehyde resin.

10. A composition according to claim 3 wherein said vinyl alcohol resin is from about 70–90% hydrolyzed.

* * * * *